United States Patent
Wang

(10) Patent No.: US 8,804,886 B2
(45) Date of Patent: Aug. 12, 2014

(54) SOFT CANCELLATION OF INTER-LAYER INTERFERENCE WITHIN A MIMO CODEWORD

(75) Inventor: Yi-Pin Eric Wang, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 581 days.

(21) Appl. No.: 13/091,062

(22) Filed: Apr. 20, 2011

(65) Prior Publication Data

US 2012/0099638 A1     Apr. 26, 2012

Related U.S. Application Data

(60) Provisional application No. 61/358,196, filed on Jun. 24, 2010.

(51) Int. Cl.
*H04B 1/10*     (2006.01)

(52) U.S. Cl.
USPC ........... 375/350; 375/260; 375/267; 375/346; 375/348

(58) Field of Classification Search
USPC ......................... 375/350, 260, 267, 346, 348
See application file for complete search history.

(56) References Cited

U.S. PATENT DOCUMENTS

| 2002/0181604 | A1 | 12/2002 | Chen |
| 2005/0053172 | A1 | 3/2005 | Heikkila |
| 2006/0159120 | A1* | 7/2006 | KIm .............................. 370/465 |

FOREIGN PATENT DOCUMENTS

GB     2403104 A     12/2004

OTHER PUBLICATIONS

Varanasi, M. K. et al. "Optimum Decision Feedback Multiuser Equalization with Successive Decoding Achieves the Total Capacity of the Gaussian Multiple-Access Channel," in Proc. Assilomar Conf. on Signals, Systems, and Computers, Monteray, CA, Nov. 1997.
Laot, C. et al. "Turbo Equalization: Adaptive Equalization and Channel Decoding Jointly Optimized", IEEE J. Sel. Areas Commun., IEEE Journal on Selected Areas in Communications, vol. 19, No. 9, Sep. 2001.
Berardinelli, G. et al. "Improving SC-FDMA Performance by Turbo Equalization in UTRA LTE Uplink," IEEE Vehicular Technology Conference, May 2008.
Berardinelli, G. et al., " Turbo Receivers for Single User MIMO LTE-A Uplink", IEEE Vehicular Technology Conference, May 2009.
Park, C. S. et al., "Evolution of Uplink MIMO for LTE-Advanced", IEEE Communications Magazine, Feb. 2011.
International Search Report and Written Opinion (for corresponding International Application—PCT/IB2011/052692), Oct. 7, 2011.
International Preliminary Report on Patentability (for corresponding International Application—PCT/IB2011/052692), Dec. 28, 2012.

* cited by examiner

*Primary Examiner* — Kabir A Timory
(74) *Attorney, Agent, or Firm* — Patent Portfolio Builders PLLC

(57) ABSTRACT

A receiver for processing a received signal encoded with a codeword and mapped to two layers includes a plurality of equalizers for equalizing the received signal, a plurality of demodulators for demodulating a respective equalized signal, a decoder for decoding the demodulated signal by extracting soft bits from the demodulated signal, a modulator for modulating the decoded signal by generating soft symbols based on the extracted soft bits, a demapper for demapping the modulated signal to soft symbols corresponding to each of the two layers and a plurality of inter-layer interference cancellers for cancelling interference utilizing the demapped soft symbols wherein the demapped soft symbols are utilized also by the equalizers to reduce inter-symbol interference.

21 Claims, 9 Drawing Sheets

| Number of layers | Number of code words | Codeword-to-layer mapping $i = 0,1,...,M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ <br> $x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$ <br> $x^{(1)}(i) = d^{(0)}(2i+1)$ | $M_{symb}^{layer} = M_{symb}^{(0)}/2$ |
| 3 | 2 | $x^{(0)}(i) = d^{(0)}(i)$ <br> $x^{(1)}(i) = d^{(1)}(2i)$ <br> $x^{(2)}(i) = d^{(1)}(2i+1)$ | $M_{symb}^{layer} = M_{symb}^{(0)} = M_{symb}^{(1)}/2$ |
| 4 | 2 | $x^{(0)}(i) = d^{(0)}(2i)$ <br> $x^{(1)}(i) = d^{(0)}(2i+1)$ <br> $x^{(2)}(i) = d^{(1)}(2i)$ <br> $x^{(3)}(i) = d^{(1)}(2i+1)$ | $M_{symb}^{layer} = M_{symb}^{(0)}/2 = M_{symb}^{(1)}/2$ |

FIG. 1

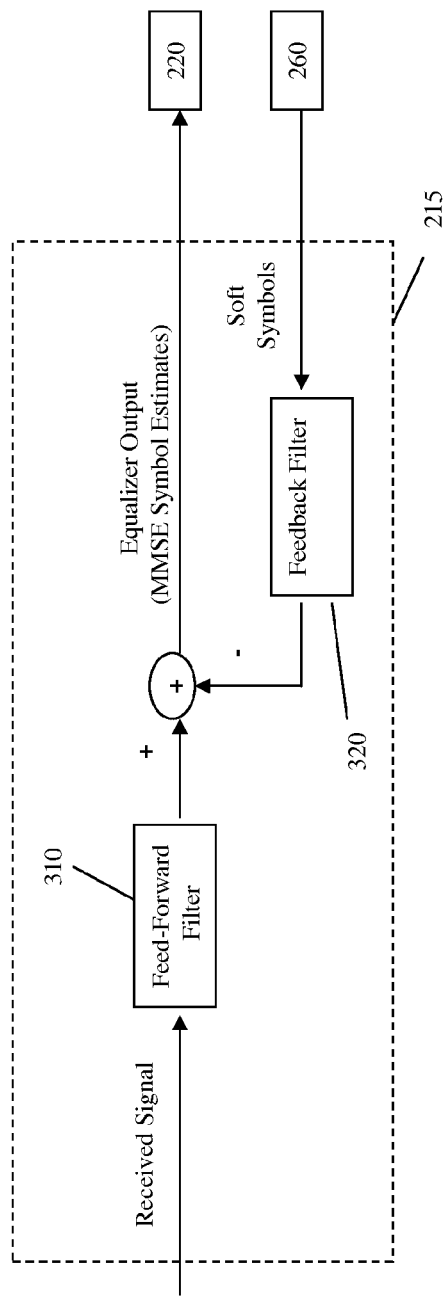
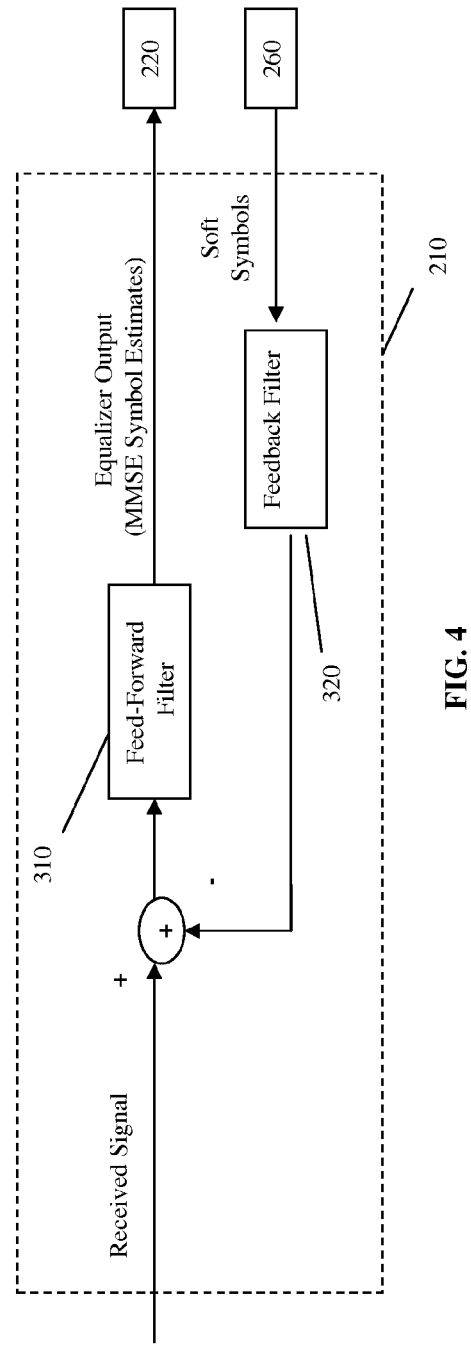
FIG. 3
FIG. 4

SOFT CANCELLATION OF INTER-LAYER INTERFERENCE WITHIN A MIMO CODEWORD

PRIORITY CLAIM

This application claims priority from U.S. Provisional Patent Application No. 61/358,196 entitled "Soft Cancellation Of Inter-Layer Interference Within A MIMO Codeword" and filed on Jun. 24, 2010, the subject matter of which is incorporated in its entirety herein by reference.

TECHNICAL FIELD

The invention relates generally to multi-layer communications, and more particularly, to mechanisms for reducing or eliminating inter-layer interference.

BACKGROUND

The demand for higher data rates and performance is constantly increasing in communications. One approach that is currently used for meeting this increased demand is the implementation of multiple-input, multiple-output (MIMO) antenna systems.

In MIMO systems, data streams are individually mapped and modulated prior to being pre-coded and transmitted by different (physical) antennas of a transmitter. The combined data streams are received by multiple antennas of a receiver. The receiver extracts the separate data streams from the combined data streams by using, for example, minimum mean-square error (MMSE) or successive interference cancellation (SIC) algorithms.

Downlink (DL) single-user (SU) MIMO was introduced in LTE in release-8. Uplink (UL) SU-MIMO has recently been standardized in 3GPP for release-10. Both DL and UL SU-MIMO use identical same-layer mapping schemes as illustrated in FIG. 1 to map symbols from different codewords to the layers used for transmission.

As illustrated in the layer-to-codeword mapping (FIG. 1), in some cases, one codeword may be mapped to multiple layers (such as in rows 3, 4 and 5 where the number of codewords is less than the number of layers).

UL LTE employs single-carrier frequency-division multiple-access (FD-FDMA), which suffers inter-symbol interference (ISI) in multipath dispersive channels. A linear MMSE frequency-domain (FD) equalization is a common solution for UL LTE in alleviating ISI. While this equalization performs well in single-input multiple-output (SIMO) systems, its performance is less than optimal in MIMO systems when MIMO interference, e.g. inter-layer interference is present in addition to ISI.

A successive interference cancellation (SIC) receiver provides better (than MMSE) performance for MIMO reception. SIC receivers with per layer rate control have achieved open-loop MIMO capacity in flat channels as described in "*Optimum decision feedback multiuser equalization with successive decoding achieves the total capacity of the Gaussian multiple-access channel*" (by M. K. Varanasi and T. Guess, Proc. Asilomar Conf. on Signals, Systems, and Computers, Monterey, Calif., November 1997, pp. 1405-1409), the subject matter of which is incorporated in its entirety herein by reference.

A SIC receiver detects a signal sent by the first layer. Upon detection and decoding of the signal from the first layer, the receiver cancels the interference contributed by the detected first layer signal before it detects the next layer signal. The process is repeated until the signals from all the layers are detected. In typical operation, a layer signal is cancelled when the CRC checks. With perfect per-layer rate-control, the transmission rate for each layer can be chosen to have an arbitrarily low block error rate (BLER). As such, the SIC receiver can always cancel interference contributed by previously detected layers.

In practice, however, certain limitations exist with SIC receivers. The performance of a SIC receiver is largely degraded due to link adaptation inaccuracy. Link adaptation inaccuracy may result in the transmission rate of a layer being higher than what can be supported. In this case, the CRC for this layer signal does not check. Consequentially, the layers that are subsequently detected will have block errors as their rates were determined based on no interference from earlier detected layers. Further, some of the MIMO configurations do not use per layer rate control. When multiple layers are mapped to the same codeword for example, they share the same transmission rate, and thus a deviation from per-layer rate control. In this case, a SIC receiver does not reduce interference contributed by other layers mapped to the same codeword.

What is desired, therefore, is a receiver having improved MIMO reception when multiple layers are mapped to the same codeword.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing or other objects are achieved in methods, systems, and apparatuses for providing cancellation of interference from other layers in situations where multiple layers are mapped to one (or same) codeword.

According to one embodiment, a method of processing a received signal that is encoded with a codeword and mapped to two layers is disclosed. The method includes equalizing the received signal, demodulating the equalized signal, decoding the demodulated signal by extracting soft bits, modulating the decoded signal by generating soft symbols based on the extracted soft bits, demapping the modulated signal to soft symbols corresponding to each of the two layers and cancelling inter-layer interference utilizing the demapped soft symbols.

According to another embodiment, a receiver for processing a received signal encoded with a codeword and mapped to two layers is disclosed. The receiver includes a plurality of equalizers for equalizing the received signal, a plurality of demodulators for demodulating a respective equalized signal, a decoder for decoding the demodulated signal by extracting soft bits, a modulator for modulating the decoded signal by generating soft symbols based on the extracted soft bits, a demapper for demapping the modulated signal to soft symbols corresponding to each of the two layers and a plurality of inter-layer interference cancellers for cancelling interference utilizing the demapped soft symbols.

According to a preferred embodiment, there are two equalizers and two inter-layer interference cancellers (ILICs). Each equalizer equalizes one layer signal to produce equalized symbols for that layer. A first equalizer equalizes first layer signal(s) to produce equalized symbols for the first layer. A second equalizer equalizes second layer signal(s) to produce equalized symbols for the second layer.

Soft symbols corresponding to the first layer are provided to the first equalizer that is processing the first layer signals to reduce inter-symbol interference. The first layer soft symbols are also provided to the second ILIC to cancel interference from the first layer.

Soft symbols corresponding to the second layer are provided to the second equalizer that is processing the second layer signals to reduce inter-symbol interference. The second layer soft symbols are also be provided to the first ILIC to cancel interference from the second layer.

According to a further embodiment, an apparatus for cancelling inter-codeword and inter-layer interference is disclosed. The apparatus includes a first receiver and a second receiver wherein each receiver processes signals encoded with a respective codeword and mapped to two layers. Each receiver includes two equalizers for equalizing the received signal, two demodulators for demodulating the respective equalized signal, a decoder for decoding the demodulated signal by extracting soft bits, a modulator for modulating the decoded signal by generating soft symbols based on the extracted soft bits, a demapper for demapping the modulated signal to soft symbols corresponding to each of the two layers and two inter-codeward and inter-layer interference cancellers (ICILICs) for cancelling inter-codeword and inter-layer interference utilizing the demapped soft symbols.

According to yet another embodiment, a receiver for processing a received signal encoded with a codeword and mapped to two layers is disclosed. The receiver includes a plurality of equalizers for equalizing the received signal, a plurality of demodulators for demodulating a respective equalized signal, a decoder for decoding the demodulated signal by extracting soft bits from the demodulated signal wherein each soft bit comprises a probabilistic estimate of a value of a corresponding bit of the received signal, a demapper for demapping the decoded signal to soft bits corresponding to each of the two layers, a plurality of modulators for modulating the demapped soft bits associated with each of the two layers by generating soft symbols based on the demapped soft bits wherein each soft symbol represents a probabilistic estimate of a value of a corresponding symbol in the received signal and a plurality of inter-layer interference cancellers for cancelling interference utilizing the generated soft symbols.

According to yet a further embodiment, a method of removing interference from a received signal encoded with a codeword and mapped to two layers is disclosed. The method includes equalizing the received signal, demodulating the equalized signal, decoding the demodulated signal by extracting soft bits from the demodulated signal wherein each soft bit comprises a probabilistic estimate of a value of a corresponding bit of the received signal, demapping the decoded signal to soft bits corresponding to each of the two layers, modulating the demapped soft bits associated with each of the two layers by generating soft symbols based on the demapped soft bits wherein each soft symbol represents a probabilistic estimate of a value of a corresponding symbol in the received signal and cancelling inter-layer interference utilizing the generated soft symbols.

BRIEF DESCRIPTION OF THE DRAWINGS

The objects and advantages of the invention will be understood by reading the following detailed description in conjunction with the drawings in which:

FIG. 1 illustrates a layer to codeword mapping table;

FIGS. 3 and 4 illustrate soft symbol subtraction in a MMSE-DFE (Decision Feedback Equalizer);

DETAILED DESCRIPTION

Figure 2:
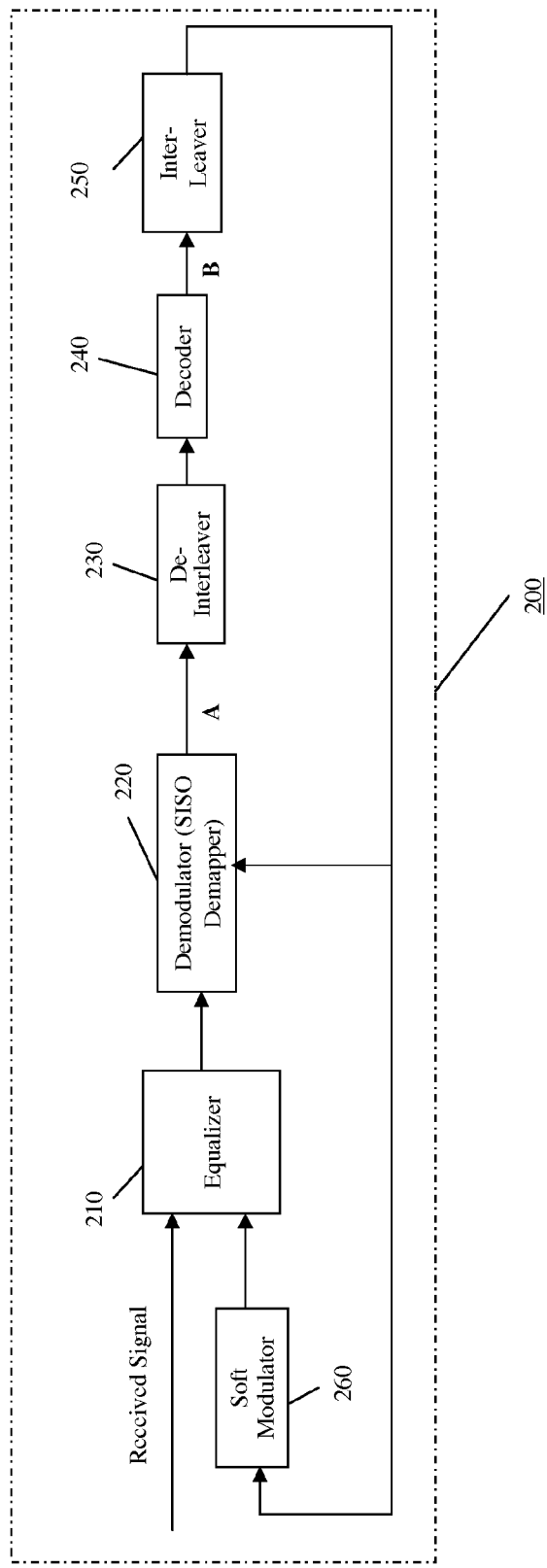
FIG. 2 illustrates the exchange of information between an equalizer/demodulator and decoder of a receiver.

The various features of the invention will now be described with reference to the figures in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both.

Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

MMSE turbo equalization has been proposed for reducing inter-symbol interference (ISI) in a GSM/EDGE system as described in *Turbo Equalization: Adaptive Equalization and Channel Decoding Jointly Optimized* (by C. Laot, R. Le Bidan, and D. Leroux, IEEE J. Sel. Areas Commun., vol. 19, no. 9, pp. 965-974, September 2001), the subject matter of which is incorporated in its entirety herein by reference.

This receiver technique can also be applied to LTE UL for SIMO or MIMO reception as described in *Improving SC-FDMA performance by turbo equalization in UTRA LTE uplink* (by G. Berardinelli, B. E. Priyanto, T. B. Sorensen, and P. Mogensen, IEEE Vehicular Technology Conference, pp. 2557-2561, May 2008); and in *Turbo receiver for single user MIMO LTE-A uplink* (by G. Berardinelli, C. N. Manchon, L. Deneire, T. B. Sorensen, P. Mogensen, and K. Pajukoski, in Proc. IEEE Veh. Technol. Conf. (VTC), Barcelona, Apr. 26-29, 2009, pp. 1-5), the subject matter of which is incorporated in its entirety herein by reference.

A MMSE turbo equalizer performs, inter alia, turbo operation and soft symbol subtraction.

Turbo operation refers to the exchange of information between the equalizer and demodulator and (turbo) decoder of a receiver such as that illustrated in FIG. 2. In receiver 200 of FIG. 2, equalizer 210, demodulator 220 and (turbo) decoder 240 estimate the probabilistic information (usually bit log-likelihood ratio, LLR) about each received bit. The equalizer 210 and demodulator 220 utilize the modulation constellation structure (e.g. QPSK, 16-QAM or 64-QAM) to derive an estimate of the probabilistic information for each received bit (from the received signal).

Based on this probabilistic information, the (turbo) decoder 240 utilizes the forward error correction (FEC) code structure to further improve the probabilistic estimate about a received bit being a zero (0) versus the received bit being a one (1). This involves a modification to the turbo decoder 240 to generate LLRs for the parity bits, in addition to those for the systematic bits. Such probabilistic information from the decoder 240 is provided back (via interleaver 250) to both equalizer 210 (via soft modulator 260) and to demodulator 220 as a basis for it (i.e. the equalizer/demodulator) to further improve the probabilistic estimate. The estimates about received bits become more accurate as more information exchanges take place.

As illustrated in FIG. 2, the information generated by equalizer/demodulator 210/220 (designated as "A" in FIG. 2) is used by the decoder 240 to generate information (designated as "B" in FIG. 2), which is then provided back to equalizer/demodulator 210/220 to refine the estimate of A.

Soft symbol subtraction can be utilized in a MMSE-DFE (Decision Feedback Equalizer) to suppress the inter symbol interference (ISI). As illustrated in FIG. 3, the feed-forward filter 310 and feedback filter 320 are optimized to obtain a MMSE symbol estimate at the equalizer output. As such, the square error between the transmitted symbol and the estimated output is minimized.

In an alternative implementation, the interference may be removed before the feed-forward filter 310 (as described in *Turbo Equalization* . . . ) as illustrated in FIG. 4. In this case, the feedback 320 filter has the same response as the channel response; it is also more straightforward way to design the feedback filter. The purpose of the feedback filter 320 is to generate the received version of the estimated soft symbols according to the channel response.

The soft symbol cancellation approach can be extended to suppress inter-codeword interference as described in *Turbo receivers for single user MIMO LTE-A uplink* (by G. Berardinelli, C. N. Manchon, L. Deneire, T. B. Sorensen, P. Mogensen, and K. Pajukoski, at IEEE Vehicular Technology Conference, May 2009), the subject matter of which is incorporated in its entirety herein by reference.

Figure 5:
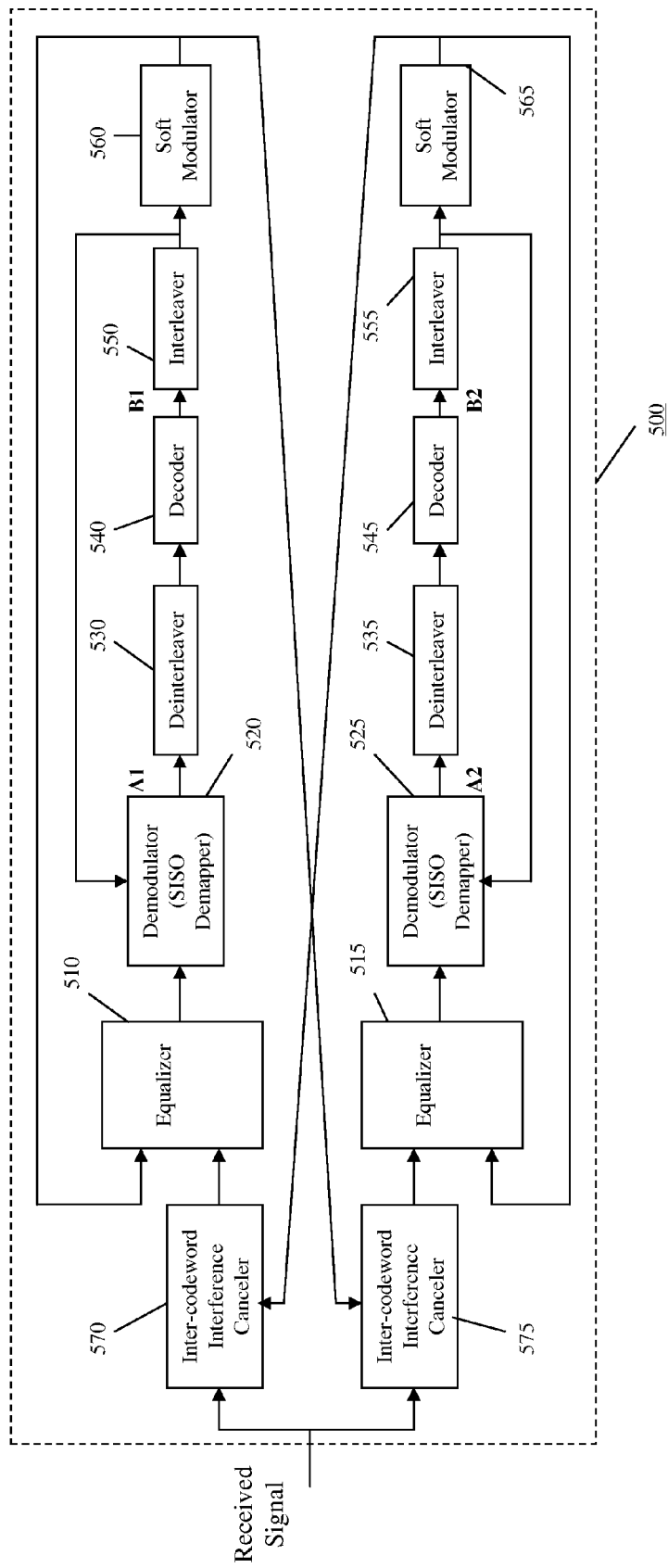
FIG. 5 illustrates a receiver incorporating inter-codeword suppression.

A receiver incorporating inter-codeword suppression is illustrated in FIG. 5. Receiver 500 includes an inter-codeword interference canceller 570 ("ICIC") which cancels interference caused by other codewords prior to providing a "clean" version of the received signal to the equalizer 510 for processing.

The term "other" in this example may refer to codewords that correspond to signals that are being processed by equalizers other than equalizer 510; they may correspond to equalizer 515 in this case. For illustrative purposes, only two ICICs (570 and 575) are shown in FIG. 5 to indicate that two codewords (e.g. CW1 and CW2) may be involved/processed in this case. If there are three codewords, three ICICs may be implemented; if there are n codewords, n number of ICICs may be implemented, etc.

The components of receiver 500 of FIG. 5 (i.e. demodulators 520/525, deinterleavers 530/535, decoders 540/545 and interleavers 550/555) perform the functions as described above with respect to receiver 200 of FIG. 2. Soft modulator 560 may provide soft symbols for the (signal corresponding to the) codeword ($CW_1$) being processed by equalizer/demodulator 510/520. In this example, the "other" codeword (from equalizer 510 point of view) may refer to the (signal corresponding to the) codeword ($CW_2$) that is being processed by equalizer/demodulator 515/525. As illustrated, soft modulator 560 provides soft symbols for $CW_1$ to equalizer 510 and to ICIC 575. ICIC 575 can utilize these symbols to remove interference from $CW_1$.

Similarly, soft modulator 565 may provide soft symbols for the (symbol corresponding to the) codeword ($CW_2$) being processed by equalizer/demodulator 515/525. In this example, the "other" codeword (from equalizer 515 point of view) may refer to the (signal corresponding to the) codeword ($CW_1$) being processed by equalizer/demodulator 510/520. As illustrated, soft modulator 565 provides soft symbols for $CW_2$ to equalizer 515 and to ICIC 570. ICIC 570 can utilize these symbols to remove interference from $CW_2$.

The method described with reference to receiver 500 of FIG. 5 results in a significant improvement in the performance when the number of codewords is equal to the number of layers (i.e., when each codeword is mapped to one layer). It is, however, not particularly relevant when one codeword is mapped to multiple layers.

Exemplary embodiments disclose a method and apparatus for suppressing interference from multiple layers when one codeword is mapped to multiple layers.

Figure 6A:
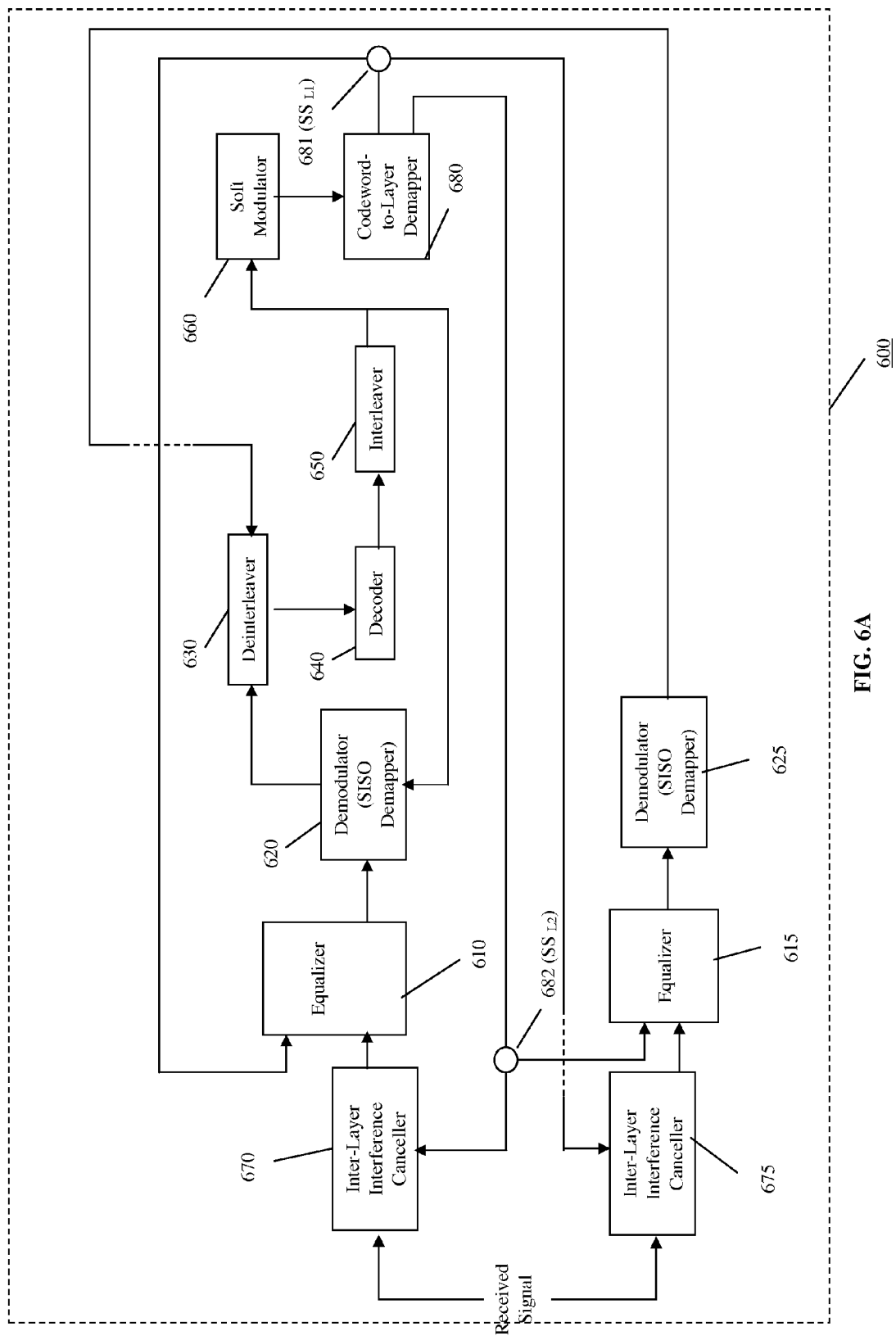
FIGS. 6A and 6B illustrate a receiver in accordance with exemplary embodiments.

A receiver in accordance with exemplary embodiments is illustrated in FIG. 6A. The arrangement illustrated in FIG. 6A processes signals encoded with one codeword that are mapped to two layers. Receiver 600 may include, inter alia, an inter-layer interference canceller 670 ("ILIC") for removing interference from multiple layers when one (i.e. the same) codeword is mapped to multiple layers.

ILIC 670 may cancel interference caused by other layers prior to providing a "clean" version of the received signal to equalizer 610 for processing. Receiver 600 may also include, inter alia, a codeword-to-layer demapper 680. Demapper 680 may separate symbols from other layer signals that are mapped to the same codeword. Soft symbols 681 corresponding to the layer signal ($SS_{L1}$—soft symbol for layer 1 in FIG. 6A) that is being processed by equalizer and demodulator (610 and 620) may be separated from symbols 682 corresponding to other layer signal such as the layer ($SS_{L2}$—soft symbol for layer 2 in FIG. 6A) being processed by equalizer and demodulator 615 and 625 for example.

Soft symbol(s) 681 (i.e. corresponding to layer 1) may be provided to equalizer 610 that is processing layer 1 signals to reduce inter-symbol interference (ISI). Soft symbol(s) 681 may also be provided to ILIC 675. ILIC 675 may utilize soft symbols(s) 681 to remove (cancel) interference from layer 1 (i.e. inter-layer interference or ILI) in the signal that is processed by equalizer 615.

Soft symbol(s) 682 (i.e. corresponding to layer 2) may be provided to equalizer 615 that is processing layer 2 signals to reduce inter-symbol interference (ISI). Soft symbol(s) 682 may also be provided to ILIC 670. ILIC 670 may utilize soft symbol(s) 682 to remove (or cancel) interference from layer 2 (i.e. inter-layer interference or ILI) in the signal that is processed by equalizer 610.

ILICs 670 and 675 may thus cancel interference from other layers (i.e. inter-layer interference) that is mapped to the same codeword. As illustrated in FIG. 6A, receiver 600 includes two equalizers, 610 and 615, each of which equalizes one layer signal to produce equalized symbols for that layer.

Equalizer 610 equalizes layer 1 signal(s) to produce equalized symbols for layer 1. Equalizer 615 equalizes layer 2 signal(s) to produce equalized symbols for layer 2.

The output of demodulators 620 and 625 may be provided to deinterleaver 630. Deinterleaver, therefore, has a complete codeword. Decoder 640 may provide probabilistic information (e.g. bit LLR or soft values) about the bits in the complete codeword. Some of the bits may be mapped to layer 1 and some of the bits may be mapped to layer 2. These bits probabilistic information is used to generate soft symbols. Thus, some of the soft symbols are mapped to layer 1 and some of the soft symbols are mapped to layer 2. The codeword to layer demapper 680 may separate these soft symbols according to layers.

According to exemplary embodiments, soft symbols corresponding to other layers are cancelled. Soft symbols estimated from other codewords are also cancelled from the received signal as described further below with respect to FIG. 11. The process of inter-codeword and inter-layer cancellation further involves filtering the soft symbols with channel estimates.

Figure 6B:
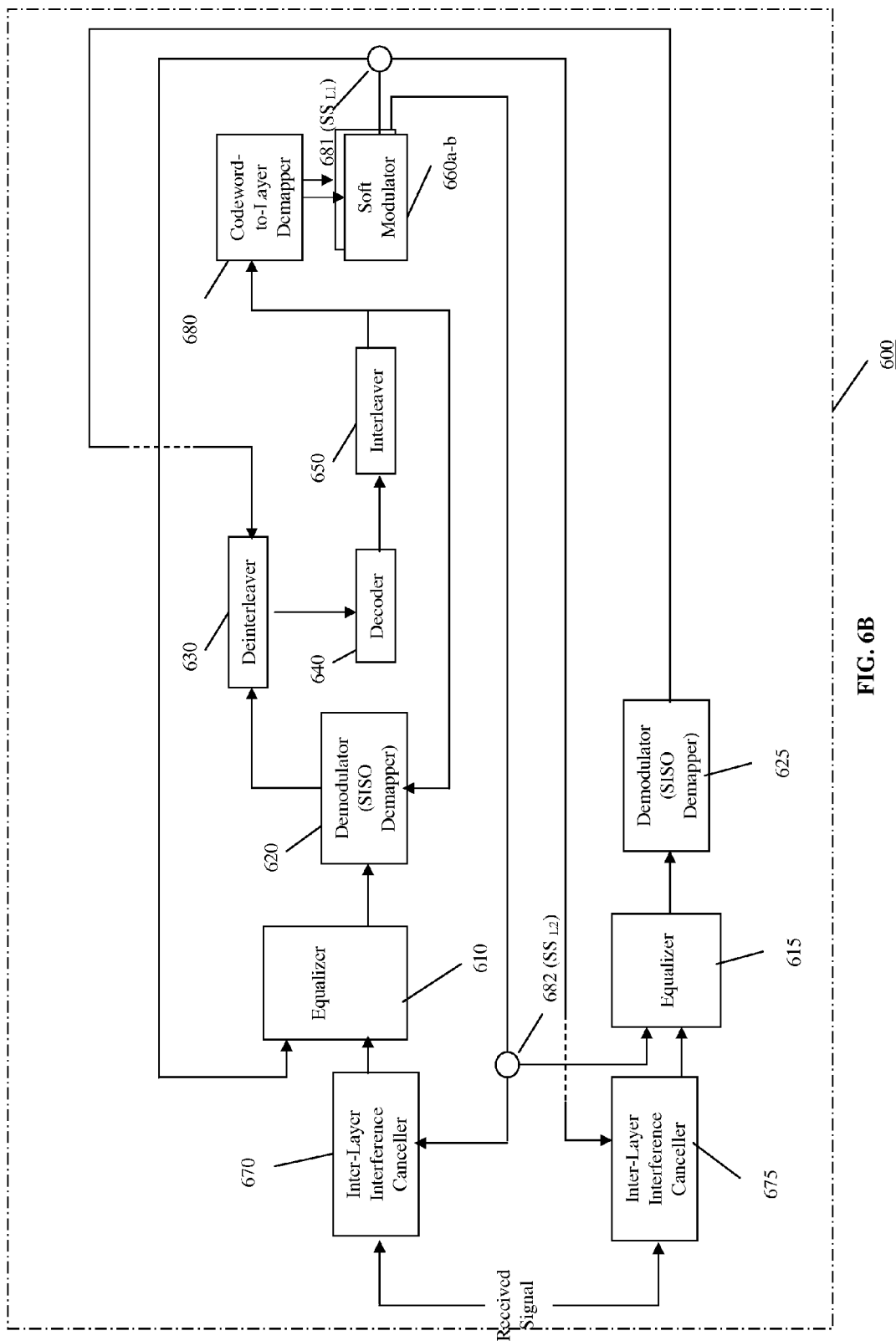

In receiver 600, positions of soft modulator 660 and codeword-to-layer demapper 680 can be interchanged. In such an alternate arrangement, the codeword-to-layer demapper 680 may separate bit LLRs (or soft values) corresponding to layer 1 from those belonging to layer 2. Soft modulators 660*a* and 660*b* may be included in such an alternative embodiment of receiver 600 as illustrated in FIG. 6B. The bits belonging to layer 1 are used by a first soft modulator 660*a* to generate soft symbols mapped to layer 1 ($SS_{L1}$), whereas the bits belonging to layer 2 are used by a second soft modulator 660*b* to generate soft symbols mapped to layer 2 ($SS_{L2}$).

In some embodiments, the received signals may be encoded with multiple codewords with each codeword being mapped to two layers. Receivers 1100*a* and 1100*b* of FIG. 11 may be utilized to process such signals. Receiver 1100*a* may process signals encoded with a first codeword ($CW_1$) and receiver 1100*b* may process signals encoded with a second codeword ($CW_2$). Each of the codewords may be mapped to one or two layers. Receiver 1100*a* may include an inter-codeword and inter-layer interference cancellers ("ICILIC") 1170*a* and 1175*a* and receiver 1100*b* may include ICILICs 1170*b* and 1175*b*.

Codeword-to-layer demapper 1180*a* of receiver 1100*a* may provide soft symbols for two layers (1181*a* and 1182*a*) to ICILIC 1170*b* and 1175*b* of receiver 1100*b* for removing interference from $CW_1$. Codeword-to-layer demapper 1180*b* of receiver 1100*b* may provide soft symbols for two layers (1181*b* and 1182*b*) to ICILIC 1170*a* and 1175*a* of receiver 1100*a* for removing interference from $CW_2$.

In receiver 1100*a*, soft symbol(s) for layer 1, 1181*a*, may be provided to equalizer 1110*a* and to ICILIC 1175*a*. Soft symbols 1181*a* may be utilized by equalizer 1110*a* to remove inter-symbol interference. Soft symbols 1181*a* may be utilized by ICILIC 1175*a* to remove interference from layer 1 (i.e. inter-layer interference).

In receiver 1100*a*, soft symbol(s) for layer 2, 1182*a*, may be provided to equalizer 1115*a* and to ICILIC 1170*a*. Soft symbol(s) 1182*a* may be utilized by equalizer 1115*a* to remove inter-symbol interference. Soft symbol(s) 1182*a* may be utilized by ICILIC 1170*a* to remove interference from layer 2 (i.e. inter-layer interference).

In receiver 1100*b*, soft symbol(s) for layer 1, 1181*b*, may be provided to equalizer 1110*b* and to ICILIC 1175*b*. Soft symbol(s) 1181*b* may be utilized by equalizer 1110*b* to remove inter-symbol interference. Soft symbol(s) 1181*b* may be utilized by ICILIC 1175*b* to remove interference from layer 1 (i.e. inter-layer interference).

In receiver 1100*b*, soft symbol(s) for layer 2, 1182*b* may be provided to equalizer 1115*b* and to ICILIC 1170*b*. Soft symbol(s) may be utilized by equalizer 1115*b* to remove inter-symbol interference. Soft symbol(s) may be utilized by ICILIC 1170*b* to remove interference from layer 2.

Figure 11:
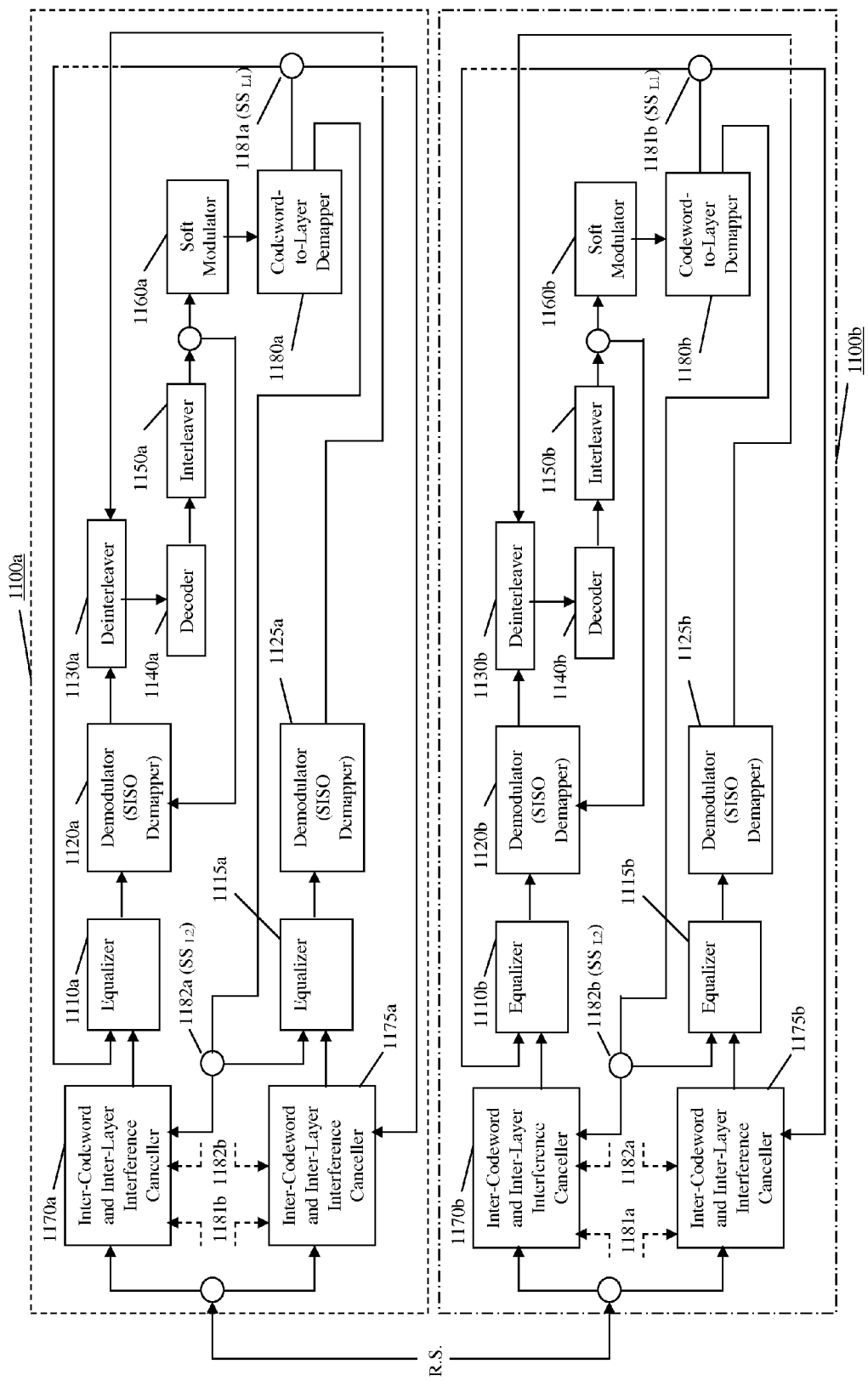
FIG. 11 illustrates an apparatus according to an exemplary embodiment.

In some embodiments, one of the codewords (i.e. a first codeword) may be mapped to two layers in a first receiver (such as receiver 1100*a* of FIG. 11 for example) while another of the codewords (i.e. a second codeword) may only be mapped to one layer in a second receiver (such as receiver 1100*b* of FIG. 11 for example).

In such embodiments, there may only be one ICILIC in the receiver (i.e. the second receiver) that is processing the codeword (i.e. second codeword) which is mapped to one layer. As a result, there may only be one soft symbol from the codeword (second codeword) being input to the ICILIC of the receiver (i.e. first receiver) that is processing the codeword (i.e. first codeword) which is mapped to two layers.

Figure 7:
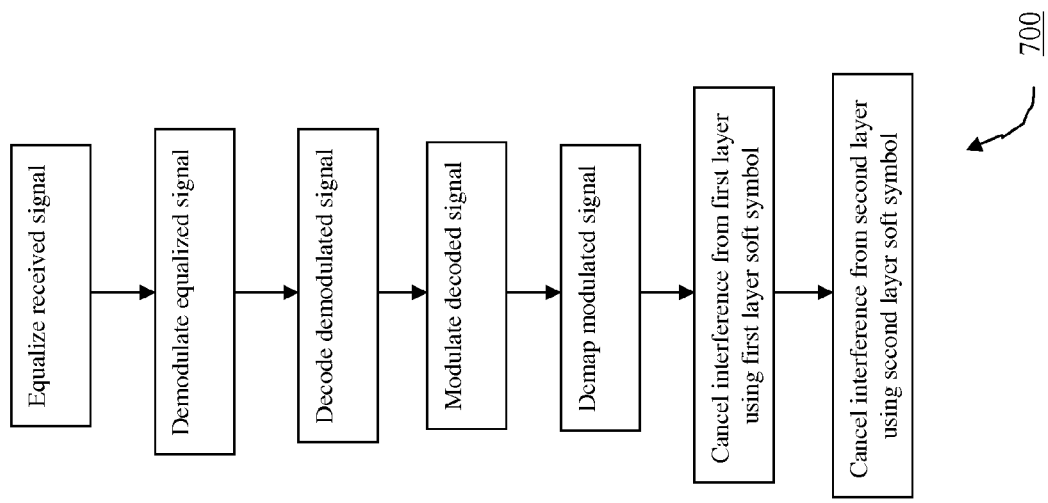
FIG. 7 illustrates a method in accordance with exemplary embodiments.

A method 700 for processing a received signal in accordance with exemplary embodiments utilizing receiver 600 is illustrated in FIG. 7. The received signal may be encoded with a codeword and mapped to two layers. The received signal may be equalized at 710. The equalized signal may be demodulated at 720. The demodulated signal may be decoded by extracting soft bits from the demodulated signal at 730. Each of these soft bits represents a probabilistic estimate of a value of a corresponding bit of the received signal. The decoded signal may be modulated by generating soft symbols based on the extracted bits at 740. Each of these soft symbols represents a probabilistic estimate of a value of a corresponding symbol in the received signal. The modulated signal may be demapped to soft symbols corresponding to each of two layers at 750. The soft symbols corresponding to a first of the two layers may be utilized to cancel interference from the first layer at 760. The soft symbols corresponding to a second of the two layers may be utilized to cancel interference from the second layer at 770.

Figure 8:
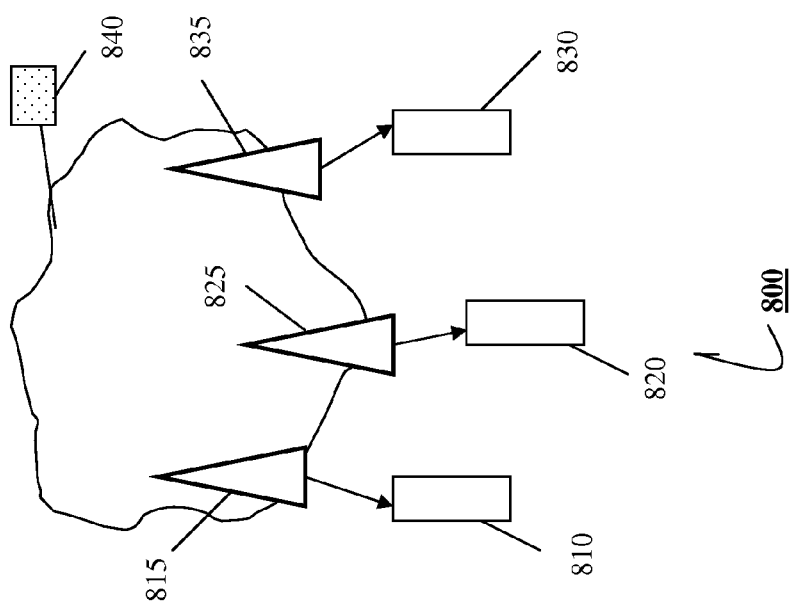
FIG. 8 illustrates an exemplary LTE network.

Although the described solutions may be implemented in any appropriate type of telecommunication system supporting any suitable communication standards and using any suitable components, particular embodiments of the described solutions may be implemented in an LTE network, such as network 800 illustrated in FIG. 8.

As illustrated, network 800 may include one or more instances of various types of network nodes, such as user equipment (UEs) 810, 820, 830 and base stations 815, 825 and 835 along with any additional elements suitable to support communication between UEs or between UEs and other communication devices 840 (such as a landline telephones). The receiver solution described above may be implemented in any appropriate component of the wireless network. In particular embodiments, the receiver solution may be particularly beneficial for use by base stations (e.g. 815) receiving and processing uplink transmissions from UEs (e.g. 810) served by those base stations.

Figure 9:
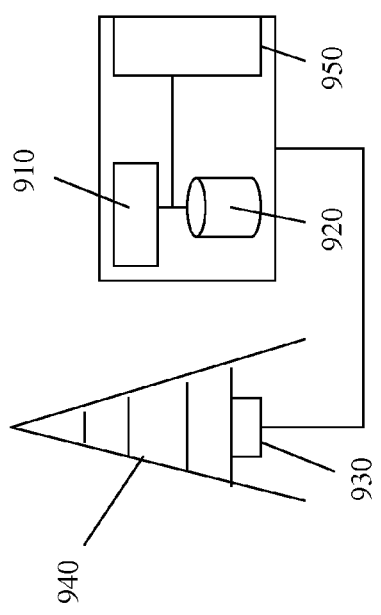
FIG. 9 illustrates a base station.

The base stations shown in the example network may each represent or include a radio base station, a base station controller, a node B, an enhanced node B, and/or any other type of mobile communications node. In general, the base stations in the example system may include any suitable combination of hardware and/or software. In particular embodiments, these base stations represent devices such as the exemplary base station 900 illustrated in FIG. 9.

Base station 900 may include processor 910, memory 920, transceiver 930, antenna 940 and network interface 950. In particular embodiments, some or all of the receiver functionality described above (including, without limitation, the functions identified in FIG. 9) may be provided by the base station processor 910 executing instructions stored on a computer-readable medium, such as memory 920. Alternative embodiments of the base station 900 may include additional components responsible for providing additional functionality, including any of the functionality identified above and/or any functionality necessary to support the solutions described above.

Figure 10:
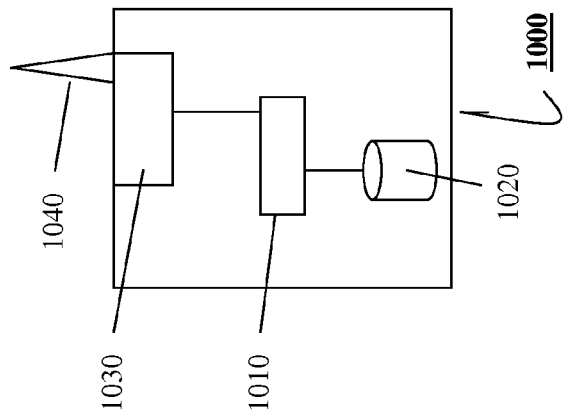
FIG. 10 illustrates user equipment.

Similarly, UEs 810, 820 and 820 in exemplary system 800 may represent communication devices that include any suitable combination of hardware and/or software. These UEs may, in particular embodiments, represent devices such as UE 1000 illustrated in FIG. 10.

As illustrated, UE 1000 may include processor 1010, memory 1020, transceiver 1030 and antenna 1040. In particular embodiments, some or all of the receiver functionality described above (including, without limitation, the functions identified in FIG. 10) may be provided by the UE processor executing instructions stored on a computer-readable medium, such as the memory shown below. Alternative embodiments of UE 1000 may include additional components beyond those shown that may be responsible for providing certain aspects of the UE's functionality, including any of the functionality described above and/or any functionality necessary to support the solutions described above.

Exemplary embodiments may be implemented in both downlink and uplink when multiple layers are mapped to the same codeword. Various embodiments provide one or more advantages. The performance of MIMO reception can be significantly improved when multiple layers are mapped to the same codeword.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A receiver for processing a received signal encoded with a codeword and mapped to two layers comprising:
a first and a second equalizer for equalizing the received signal;
a plurality of demodulators for demodulating a respective equalized signal;
a decoder for decoding the demodulated signal by extracting soft bits from the demodulated signal, wherein each soft bit comprises a probabilistic estimate of a value of a corresponding bit of the received signal;
a modulator for modulating the decoded signal by generating soft symbols based on the extracted soft bits, wherein each soft symbol represents a probabilistic estimate of a value of a corresponding symbol in the received signal;
a demapper for demapping the modulated signal to soft symbols corresponding to each of the two layers; and
a first and a second inter-layer interference canceller for cancelling interference utilizing the demapped soft symbols, wherein
the demapper provides soft symbols corresponding to a second one of the two layers to the second equalizer and to the first interlayer interference canceller; and
the first interlayer interference canceller utilizes the second layer soft symbols to reduce interference from the second layer.

2. The receiver of claim 1, wherein the demapper provides soft symbols corresponding to a first one of the two layers to the first equalizer and to the second interlayer interference canceller.

3. The receiver of claim 2, wherein the first equalizer utilizes the first layer soft symbols to reduce inter-symbol interference.

4. The receiver of claim 2, wherein the second interlayer interference canceller utilizes the first layer soft symbols to reduce interference from the first layer.

5. The receiver of claim 1, wherein the second equalizer utilizes the second layer soft symbols to reduce inter-symbol interference.

6. The receiver of claim 1, further comprising a de-interleaver intermediate the demodulator and the decoder.

7. The receiver of claim 1, further comprising an interleaver intermediate the decoder and the modulator.

8. A method of removing interference from a received signal encoded with a codeword and mapped to two layers, comprising the steps of:
equalizing the received signal by at least one of a first and a second equalizer;
demodulating the equalized signal;
decoding the demodulated signal by extracting soft bits from the demodulated signal, wherein each soft bit comprises a probabilistic estimate of a value of a corresponding bit of the received signal;
modulating the decoded signal by generating soft symbols based on the extracted bits, wherein each soft symbol represents a probabilistic estimate of a value of a corresponding symbol in the received signal;
demapping the modulated signal to soft symbols corresponding to each of the two layers; and
cancelling interference from a second one of the two layers by a first inter-layer interference canceller utilizing the demapped soft symbols corresponding to the second layer.

9. The method of claim 8, further comprising:
cancelling inter-symbol interference by the first equalizer utilizing soft symbols corresponding to a first one of the two layers.

10. The method of claim 9, further comprising:
cancelling interference from the first layer by a second inter-layer interference canceller utilizing the first layer soft symbols.

11. The method of claim 8, further comprising:
cancelling inter-symbol interference by the second equalizer utilizing soft symbols corresponding to the second layer.

12. An apparatus for cancelling inter-codeword and inter-layer interference comprising:
a first receiver and a second receiver wherein each receiver processes signals encoded with a respective codeword and mapped to two layers and each receiver comprises:
two equalizers for equalizing the received signal;
two demodulators for demodulating the respective equalized signal;
a decoder for decoding the demodulated signal by extracting soft bits from the respective demodulated signals, wherein each soft bit represents a probabilistic estimate of a value of a corresponding bit in the received signal;
a modulator for modulating the decoded signal by generating soft symbols based on the extracted soft bits, wherein each soft symbol represents a probabilistic estimate of a value of a corresponding symbol in the received signal;

a demapper for demapping the modulated signal to soft symbols corresponding to each of the two layers; and two inter-codeward and inter-layer interference cancellers (ICILICs) for cancelling inter-codeword and inter-layer interference utilizing the demapped soft symbols, wherein a first of the ICILICs in the first receiver cancels inter-layer interference utilizing the demapped soft symbols corresponding to a second one of the two layers in the first receiver.

13. The apparatus of claim 12, wherein each of the two ICILICs in the first receiver cancels inter-codeword interference utilizing the demapped soft symbols from the second receiver.

14. The apparatus of claim 12, wherein a second of the ICILICs in the first receiver cancels inter-layer interference utilizing the demapped soft symbols corresponding to a first one of the two layers in the first receiver.

15. The apparatus of claim 12, wherein each of the two ICILICs in the second receiver cancels inter-codeword interference utilizing the demapped soft symbols from the first receiver.

16. The apparatus of claim 12, wherein a first of the ICILICs in the second receiver cancels inter-layer interference utilizing the demapped soft symbols corresponding to a second one of the two layers in the second receiver.

17. The apparatus of claim 12, wherein a second of the ICILICs in the second receiver cancels inter-layer interference utilizing the demapped soft symbols corresponding to a first one of the two layers in the second receiver.

18. A receiver for processing a received signal encoded with a codeword and mapped to two layers comprising:

a first and a second equalizer for equalizing the received signal;

a plurality of demodulators for demodulating a respective equalized signal;

a decoder for decoding the demodulated signal by extracting soft bits from the demodulated signal, wherein each soft bit comprises a probabilistic estimate of a value of a corresponding bit of the received signal;

a demapper for demapping the decoded signal to soft bits corresponding to each of the two layers;

a first and a second modulator for modulating the demapped soft bits associated with each of the two layers by generating soft symbols based on the demapped soft bits, wherein each soft symbol represents a probabilistic estimate of a value of a corresponding symbol in the received signal; and a first and a second inter-layer interference canceller for cancelling interference utilizing the generated soft symbols, wherein the demapper provides soft bits associated with a first one of the two layers to the first modulator;

the first modulator provides soft symbols associated with the first layer to the first equalizer and to the second interlayer interference canceller;

the first equalizer utilizes the first layer soft symbols to reduce inter-symbol interference, and the second interlayer interference canceller utilizes the first layer soft symbols to reduce interference from the first layer.

19. The receiver of claim 18, wherein:

the demapper provides soft bits associated with a second one of the two layers to a second one of the modulators, and the second modulator provides soft symbols associated with the second layer to the second equalizer and to the first interlayer interference canceller;

the second equalizer utilizes the second layer soft symbols to reduce inter-symbol interference, and the first interlayer interference canceller utilizes the second layer soft symbols to reduce interference from the second layer.

20. A method of removing interference from a received signal encoded with a codeword and mapped to two layers, comprising the steps of:

equalizing the received signal by at least one of a first and a second equalizer;

demodulating the equalized signal;

decoding the demodulated signal by extracting soft bits from the demodulated signal, wherein each soft bit comprises a probabilistic estimate of a value of a corresponding bit of the received signal;

demapping the decoded signal to soft bits corresponding to each of the two layers;

modulating the demapped soft bits associated with each of the two layers by generating soft symbols based on the demapped soft bits, wherein each soft symbol represents a probabilistic estimate of a value of a corresponding symbol in the received signal; and cancelling inter-layer interference utilizing the generated soft symbols;

cancelling inter-symbol interference by the second equalizer utilizing soft symbols corresponding to a second one of the two layers; and cancelling interference from the second layer by a first inter-layer interference canceller utilizing the second layer soft symbols.

21. The method of claim 20, further comprising:

cancelling inter-symbol interference by the first equalizer utilizing soft symbols corresponding to a first one of the two layers; and cancelling first layer interference by a second inter-layer interference canceller utilizing the first layer soft symbols.

* * * * *